J. D. RIPSON.

Assignor, by direct and mesne assignments, of one-half to W. A. FRAZER.

BURIAL CASKET.

No. 11,075. Reissued May 6, 1890.

Witnesses
Geo. Crance
W. W. Deane.

Inventor
John D. Ripson,
By his Attorney
L. Deane

THE NORRIS PETERS CO., PHOTO-LITHO., WASHINGTON, D. C.

UNITED STATES PATENT OFFICE.

JOHN D. RIPSON, OF SUSPENSION BRIDGE, NEW YORK, ASSIGNOR, BY DIRECT AND MESNE ASSIGNMENTS, OF ONE-HALF TO WILLIAM A. FRAZER, OF SAME PLACE.

BURIAL-CASKET.

SPECIFICATION forming part of Reissued Letters Patent No. 11,075, dated May 6, 1890.

Original No. 407,792, dated July 30, 1889. Application for reissue filed October 23, 1889. Serial No. 327,950.

*To all whom it may concern:*

Be it known that I, JOHN D. RIPSON, a citizen of the United States, residing at Suspension Bridge, in the county of Niagara and State of New York, have invented certain new and useful Improvements in Burial-Caskets; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of the invention is to provide a casket with a sliding head-panel in connection with the sliding glass in such a manner that the panels shall be flush with each other and the outside of the plate of which the panels form part shall present an apparently smooth and even surface; and it consists, essentially, in forming the top of the plate of sheet metal or other thin material and recessing the plate below its top, so that grooves may be formed in it to receive the sliding glass and panel, substantially as hereinafter more particularly explained.

Figure 1:
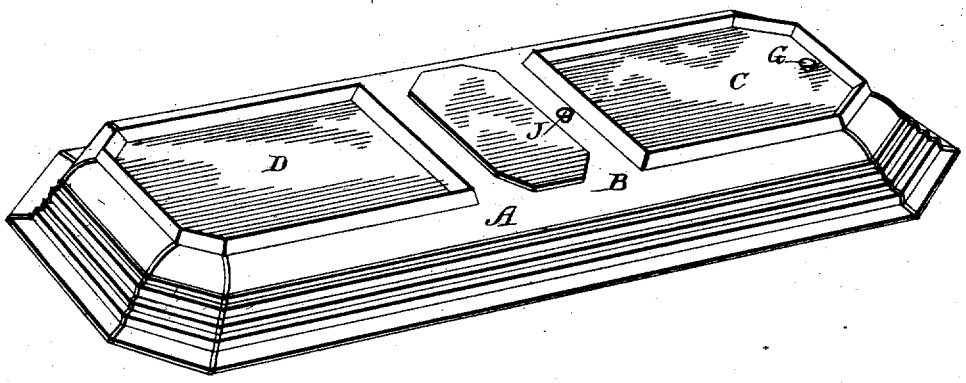
Figure 2:
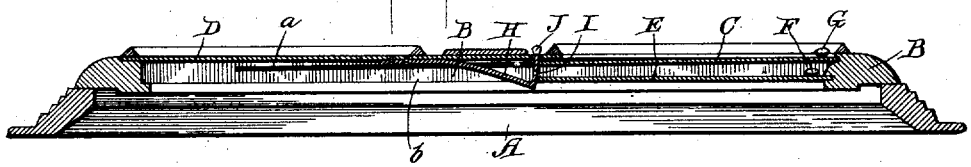
Figure 3:
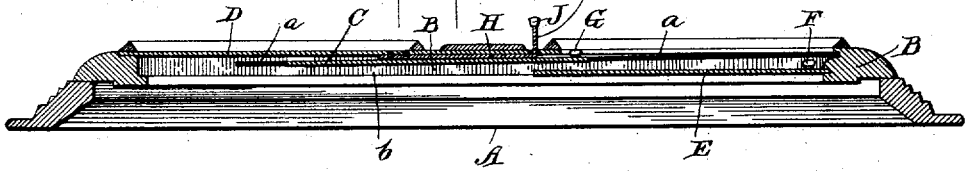
Figure 4:
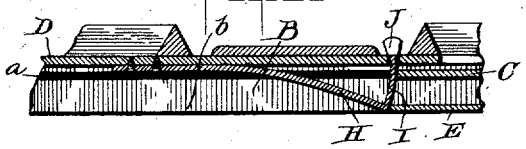

Figure 1 is a perspective outside view of my improved casket-top. Fig. 2 is a longitudinal sectional view of the same, showing the sliding glass and panel closed. Fig. 3 is a similar view showing the sliding panel open. Fig. 4 is an enlarged view in part of Fig. 2, showing engagement of catch.

In the drawings, A represents what is commonly called the "top" of the casket; B, the plate; C, the head-panel, and D the foot-panel.

It will be noticed in Fig. 1 that the entire outside face of the plate and the panels present an apparently even and smooth surface, although the head-panel C is arranged so that it may slide open. This effect is produced by cutting out or recessing the plate B below the panels, which are made of sheet metal or some other thin material, the panel C being fitted into grooves *a* made in the plate B, one on each side, and inclining slightly downward at the rear, so that the said panel may be caused to slide back, as indicated in Fig. 3, although when closed, as shown in Figs. 1 and 2, it presents the appearance of being flush with the panel D. A groove *b* is also made in the plate B to receive the glass E, which is carried in the said groove at a point sufficiently far from the bottom of the head-panel C to permit a small knob F to protrude above its surface, by which knob the glass may be readily adjusted. A similar knob G protrudes above the surface of the head-panel C, by which it may be readily adjusted.

With the view of locking the sliding glass and panel I provide a simple catch consisting of a spring H, fixed at one end to the bottom of the foot-panel D, its other end being curved downwardly to a point below the bottom of the glass E. A pin I, connected to this end of the spring H, projects through the top of the plate B, and has a knob J formed on its upper end. This pin forms a stop to lock the head-panel C and glass E when they are closed, as indicated in Figs. 1 and 2. By seizing the end of the knob J the pin I and its spring H may be readily raised clear of the panel C, when the said panel may be caused to slide back, as indicated in Fig. 3, thus holding the pin and its spring up out of the way of the glass E, which may then be caused to slide open when desired.

Although I prefer the spring-catch described, it will be understood that any kind of catch by which the sliding panel and glass may be locked will be suitable.

What I claim as my invention is—

1. A casket having a sliding head-panel and a sliding glass, in combination with a catch having a substantially vertical portion adapted to engage the end of both said panel and glass for holding the two closed, substantially as and for the purposes specified.

2. In a casket, a sliding head-panel made of sheet metal or other thin material, adapted to move in grooves inclining slightly downward at the rear and under the foot-panel, substantially in the manner and for the purposes set forth.

3. The combination of the fixed spring H and the plate to which it is fixed, with the sliding head-panel and glass, in the manner described, whereby when the head-panel is open the spring is held up and out of the way of the glass.

4. In a casket of otherwise ordinary construction, a sliding panel C, carried in grooves *a*, formed in the inner edge of the plate B, in combination with a sliding glass E, carried in grooves *b*, formed in the inner edge of the plate B below the grooves *a*, the spring-catch H I, and knobs F G, all combined and operating substantially as and for the purposes set forth.

5. In a casket of otherwise ordinary construction, the combination of the plate having grooves *a* inclining slightly downward at the rear, with the foot and sliding head-panels made of sheet metal or other thin material, the sliding panel adapted to move in said grooves without being pressed down or aided by spring-guides, in the manner and for the purposes set forth, whereby when said sliding panel is closed the panels and plate shall present an apparently even and smooth surface.

In testimony whereof I affix my signature in presence of two witnesses.

JOHN D. RIPSON.

Witnesses:
WASHINGTON A. FRAZER,
PETER LESHER.